(12) United States Patent
Pezzini

(10) Patent No.: US 7,281,073 B2
(45) Date of Patent: Oct. 9, 2007

(54) METHOD FOR CONTROLLING INTERRUPTS AND AUXILIARY CONTROL CIRCUIT

(75) Inventor: Saverio Pezzini, Vimercate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 166 days.

(21) Appl. No.: 10/727,147

(22) Filed: Dec. 3, 2003

(65) Prior Publication Data

US 2004/0143692 A1 Jul. 22, 2004

(30) Foreign Application Priority Data

Dec. 4, 2002 (IT) .......................... VA2002A0066

(51) Int. Cl.
*G06F 13/24* (2006.01)
(52) U.S. Cl. ...................... 710/260; 710/261; 710/262; 710/263; 710/264; 710/269
(58) Field of Classification Search ........ 710/260–266; 712/244
See application file for complete search history.

(56) References Cited

U.S. PATENT DOCUMENTS 5,758,169 A * 5/1998 Nizar et al. ................. 710/266
6,032,213 A * 2/2000 Gulick ........................ 710/312
6,393,555 B1 * 5/2002 Meier et al. ................. 712/222
6,449,675 B1 * 9/2002 Moyer et al. ................ 710/269
7,146,643 B2 * 12/2006 Dapp et al. .................... 726/23
2003/0226002 A1 * 12/2003 Boutaud et al. ............. 712/234

* cited by examiner

*Primary Examiner*—Mark H. Rinehart
*Assistant Examiner*—Kim T. Huynh
(74) *Attorney, Agent, or Firm*—Lisa K. Jorgenson; Allen, Dyer, Doppelt, Milbrath & Gilchrist, P.A.

(57) ABSTRACT

An auxiliary interrupt control circuit is for use in a computer system including at least one peripheral for generating interrupt requests, an interrupt pending register for storing the interrupt requests, a microprocessor for processing interrupts, and an interrupt control circuit associated with the microprocessor. The auxiliary control circuit may include an auxiliary register coupled to the priority interrupt register for storing a copy of the interrupt requests. It may further include an encoder coupled to the auxiliary register and the microprocessor for generating a bit string identifying an active bit stored in the auxiliary register corresponding to a highest priority interrupt request to be processed, and for providing the bit string to the microprocessor.

24 Claims, 8 Drawing Sheets

METHOD FOR CONTROLLING INTERRUPTS AND AUXILIARY CONTROL CIRCUIT

FIELD OF THE INVENTION

This present invention relates generally to microprocessor systems, and, more particularly, to a method and an auxiliary circuit for controlling interrupts.

BACKGROUND OF THE INVENTION

While a microprocessor is working, it may be necessary to interrupt the program it is running to execute certain instructions. This is done by using flag signals called interrupts or interrupt requests. An interrupt controller receives these flag signals from peripherals and, depending on the received interrupt, sends to the processor an interrupt command and an interrupt pointer vector. The pointer vector specifies a memory location at which a relative interrupt service routine (ISR) to be run is stored.

The microprocessor then suspends the operation in progress, saves the state of the program being run so that it may resume the program later, and carries out the instructions of the ISR routine relative to the received interrupt. When the ISR routine has been performed, the processor restores the state of the program and, if no other interrupt is pending, resumes the program from the point at which it was interrupted.

Interrupt controllers typically have priority registers for establishing which interrupt, among a plurality of received interrupts that are pending, are to be served first. A basic prior art interrupt control circuit or controller with priority ratings is illustrated in FIG. 1. The interrupt flags, INT0, . . . , INTk, which are generated by peripherals, are stored in a pending interrupt register INT PENDING REG.

The block IRQ MASK AND PRIORITY LOGIC includes a so-called mask of interrupts and a priority logic circuit. The priority logic circuit generates an interrupt request signal IRQ REQ and stores its relative priority HIGHEST PRIORITY INT in the register CURR IRQ PRIORITY REG.

A circuit HIGHEST PRIORITY INT (illustrated with a dashed box) is for processing interrupt request signals based upon the priority thereof. Its core is a state machine IRQ SM which receives as an input an interrupt request signal, and it generates an interrupt command nIRQ for the microprocessor. The interrupt request signal IRQ REQ selects an interrupt vector IRQ VECTOR corresponding to the interrupt to be served, which is read from an interrupt table IRQ VECTOR REG that stores interrupt vectors identifying corresponding ISR routines.

The register CURR IRQ PRIORITY REG and the register INT PRIORITY STACK allow so-called nested interrupts. The register CURR IRQ PRIORITY REG stores the priority of the currently served interrupt. If an interrupt with a higher priority rating is generated, servicing of the first interrupt is suspended and the relative priority is stored in the register INT PRIORITY STACK, while the new interrupt of higher priority is served and its priority is stored in the register CURR IRQ PRIORITY REG.

Once the second interrupt of higher priority has been served, the previously suspended interrupt is resumed, if it has a higher priority than any other pending interrupts. Once it has been served, it is deleted from the stack INT PRIORITY STACK by a command STACK PUSH/POP of the state machine IRQ SM.

The interrupt control circuit has a limited number of input pins dedicated for receiving interrupts from peripherals. Therefore, as illustrated in FIG. 2, only a few peripherals can avail themselves of the dedicated input pins of the interrupt control circuit, while other peripherals share a common input pin for all their interrupts.

As shown in FIG. 3, the peripheral A is connected to the interrupt control circuit INTERRUPT CONTROLLER such that each possible interrupt signal corresponds to a dedicated pin of the control circuit. By contrast, the peripheral B may use only one pin of the interrupt control circuit INTERRUPT CONTROLLER for all of its interrupts.

For peripheral B, the interrupt control circuit receives an interrupt signal IRQm that is obtained by ORing the interrupts stored in the interrupt pending register of the peripheral. When the signal IRQm is active, the interrupt control circuit sends to the microprocessor an interrupt command nIRQ and an interrupt vector IRQ VECTOR identifying a specific interrupt service routine ISR. This results in the reading of the interrupt pending register of the peripheral B for identifying the requested interrupt, and the eventual serving thereof. Of course, this burdens the processor in executing the ISR routine because it has to read the interrupt pending register of the peripheral B before serving the interrupt.

SUMMARY OF THE INVENTION

In accordance with the present invention, a method is provided for controlling interrupts which allows the microprocessor to quickly know which interrupt is to be served, even if the control circuit receives an interrupt signal resulting from ORing different interrupt flags.

The method of the invention includes generating a bit string which identifies the position of an active bit in the interrupt pending register of the peripheral requesting the interrupt, and sending the bit-string to the processor. In this way, the processor is able to substantially immediately recognize which interrupt of the peripheral is to be served or processed without having to read the interrupt pending register of the peripheral.

More particularly, a method for controlling interrupts generated by a peripheral in accordance with the present invention may include storing, in an interrupt pending register, active bits corresponding to interrupt flags generated by the peripheral. Further, an interrupt signal resulting from ORing the interrupt flags may be sent to an interrupt control circuit coupled to the peripheral. When the interrupt control circuit receives the interrupt signal, the interrupt signal may be identified and served.

In accordance with the invention, identification of the interrupt to be served is significantly less burdensome on the processor that executes the corresponding routine. This is done by generating in the peripheral a bit string identifying, by a corresponding active bit of the string, the interrupt to be served, and sending this bit string to a processor that will so recognize the interrupt based thereon and eventually serve it by executing the corresponding routine.

The above-described method may be implemented by an auxiliary control circuit that includes an encoding circuit for encoding in a bit string the position of an active bit stored in the interrupt pending register of the peripheral that generated an interrupt flag. The auxiliary control circuit may then send the bit string to the processor. By way of example, the auxiliary control circuit may be implemented in a dedicated device to which a plurality of peripherals are coupled, or it may be implemented in each one of the peripherals.

BRIEF DESCRIPTION OF THE DRAWINGS

The various aspects and advantages of the present invention will become more apparent through a detailed description thereof, with reference to the accompanying drawings, in which.

DETAILED DESCRIPTION OF THE PREFERRED EMBODIMENTS

Figure 1:
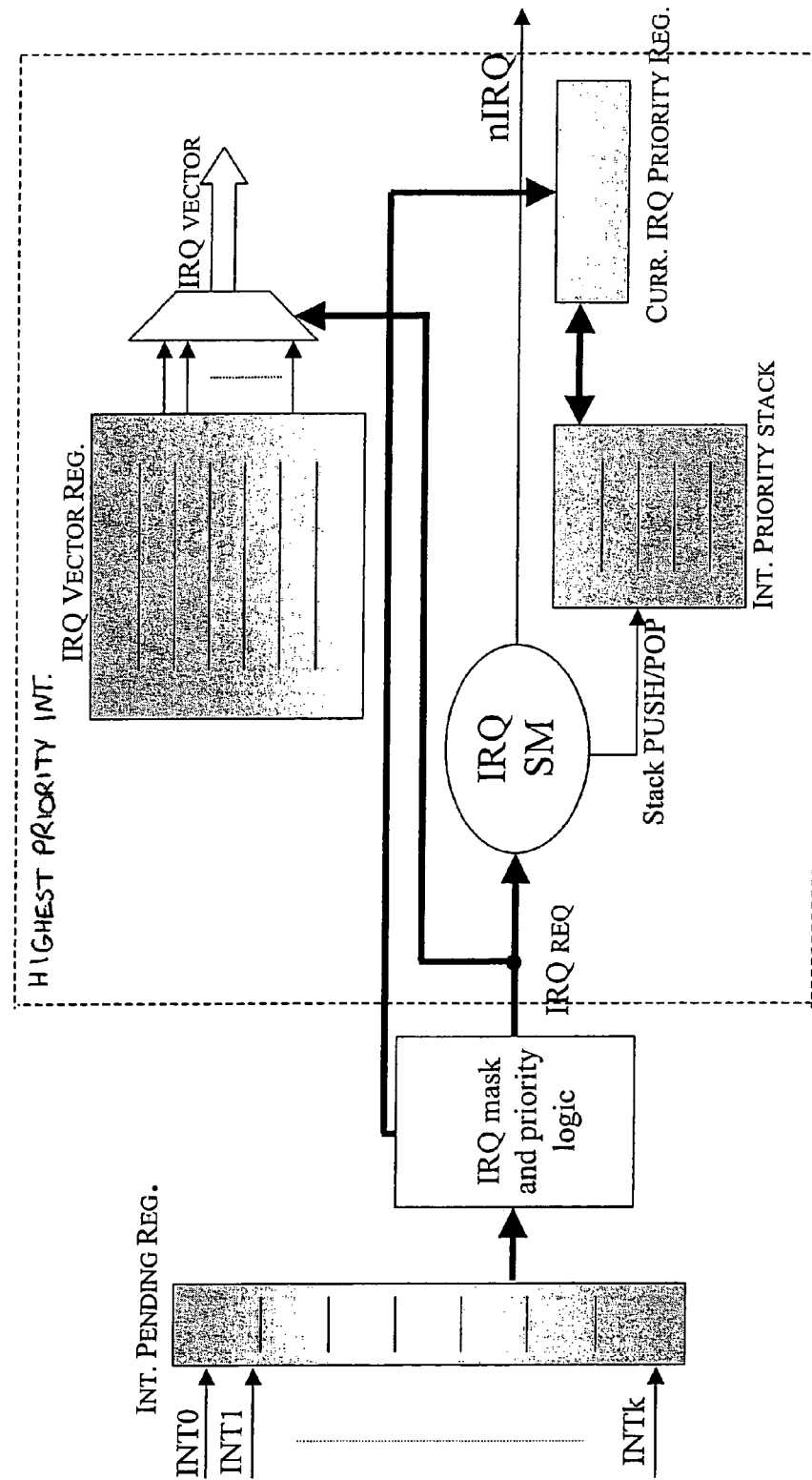
FIG. 1 is schematic circuit diagram of a basic prior art interrupt control circuit.
Figure 2:
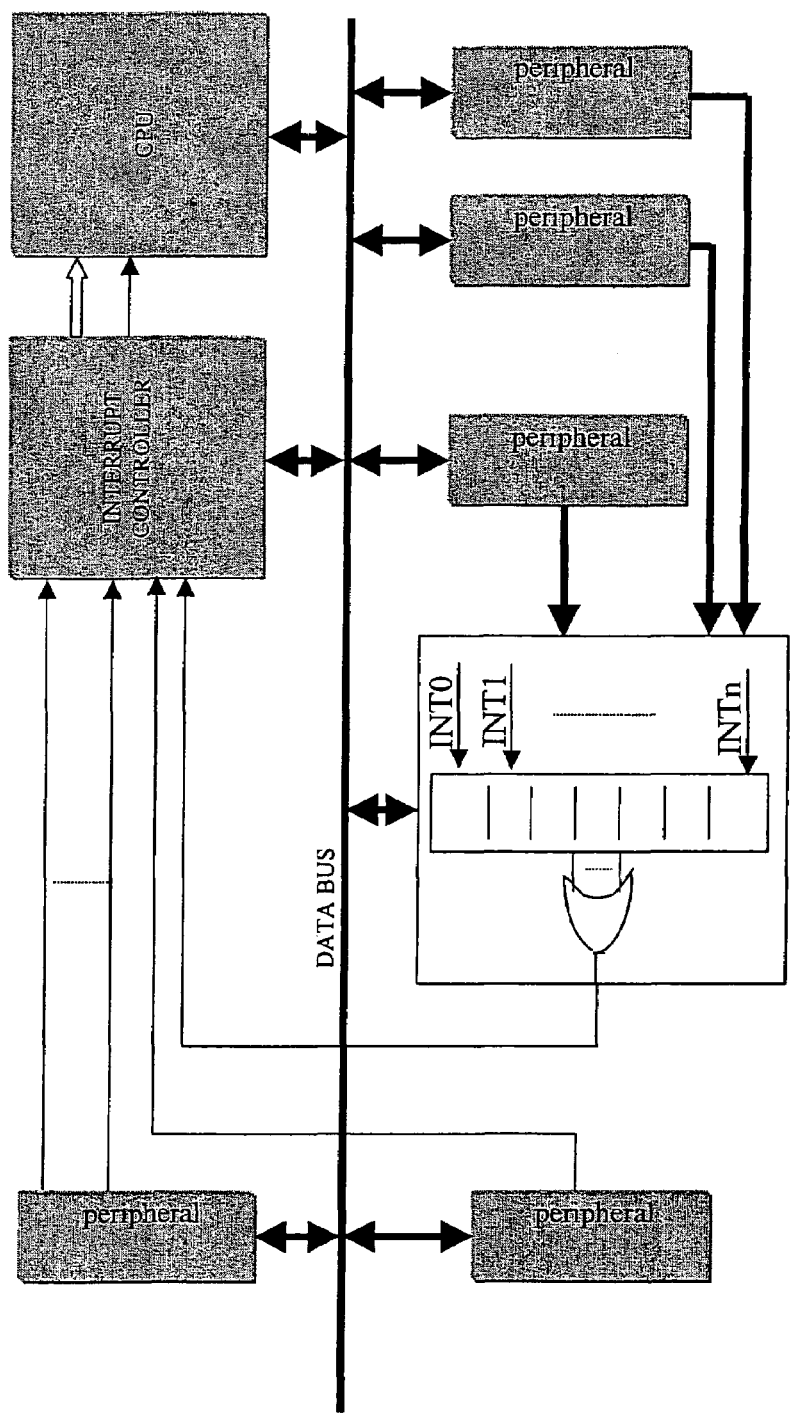
FIG. 2 is a schematic circuit diagram of a prior art microprocessor system in which certain peripherals send interrupts to the microprocessor via dedicated pins of the control circuit, while the interrupts of other peripherals share a single pin.
Figure 3:
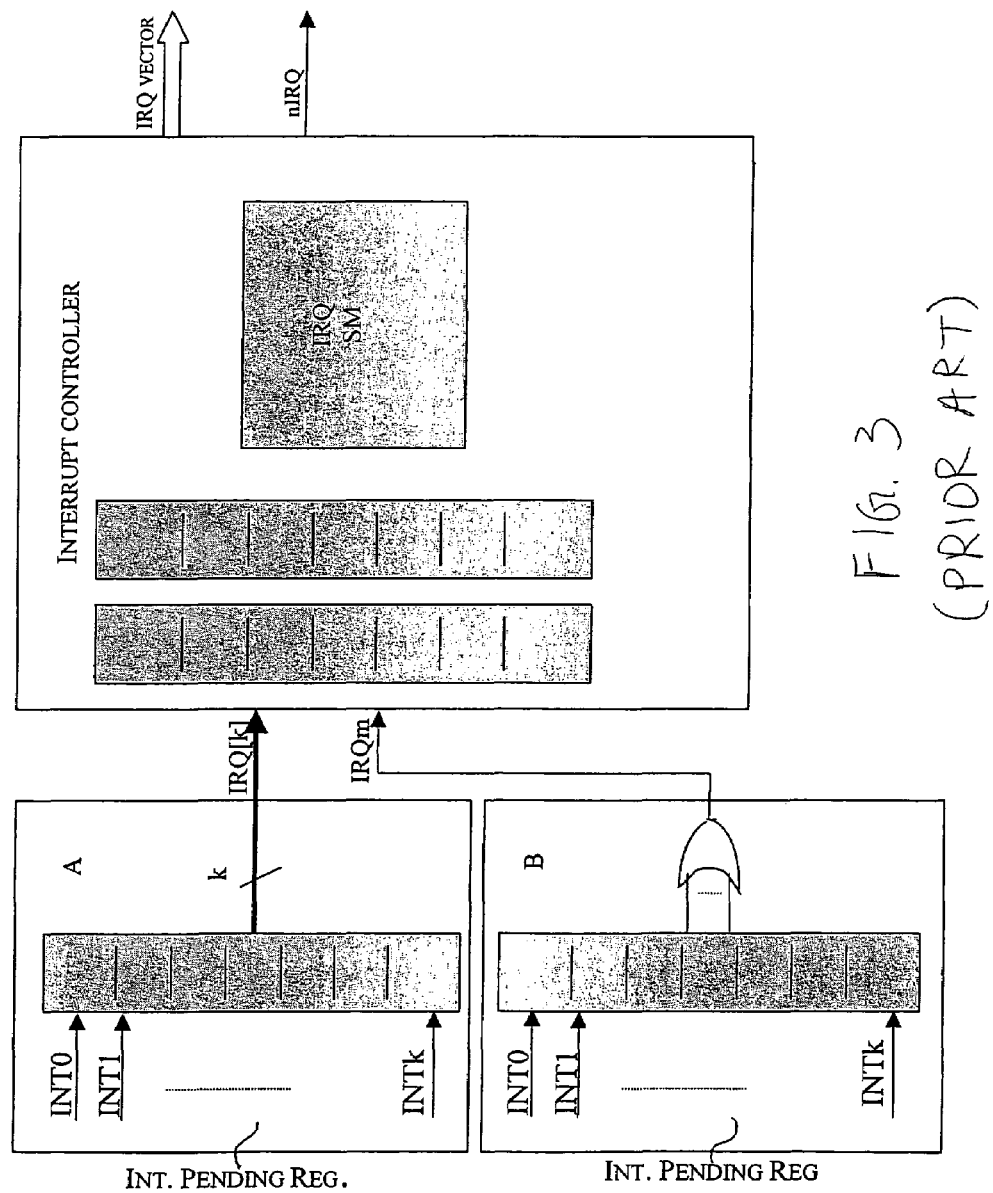
FIG. 3 is a schematic circuit diagram of two interrupt pending registers connected in different ways to an interrupt control circuit in accordance with the prior art.
Figure 4:
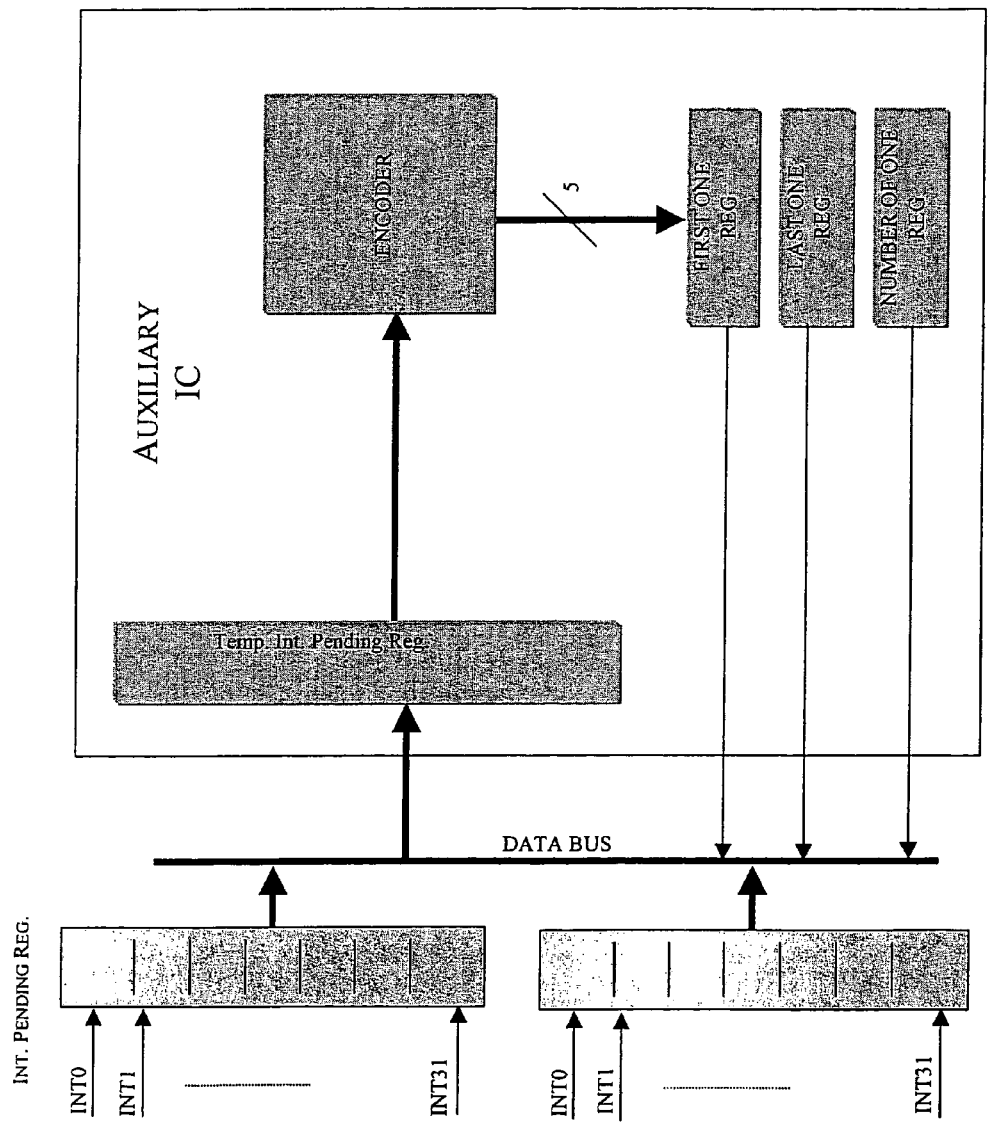
FIG. 4 is a schematic circuit diagram illustrating a first embodiment of an auxiliary interrupt control circuit in accordance with the present invention connected to a plurality of peripherals.

Referring now to FIG. 4, a first embodiment of the auxiliary interrupt control circuit AUXILIARY IC in accordance with the present invention is first described. This circuit may be implemented as a device distinct from the peripherals and from the interrupt control circuit INTERRUPT CONTROLLER, and it is connected to a plurality of peripherals through the bus DATA BUS as shown.

The auxiliary circuit AUXILIARY IC includes an encoding circuit ENCODER that generates a bit string. The bit string identifies the position of an active bit stored in the interrupt pending register of the peripheral that required the interrupt, and it corresponds to the interrupt to be served. This bit string is sent to the microprocessor CPU which knows substantially immediately which interrupt is to be served based thereon. This is so even if the control circuit received an interrupt signal resulting from ORing different interrupt flags. Therefore, the processor need not read the contents of the interrupt pending register of the peripheral that has requested the interrupt. Instead, it may serve it directly.

The auxiliary circuit AUXILIARY IC has an auxiliary register TEMP INT PENDING REG for use in the encoding operation. When an interrupt IRQ is received by the interrupt control circuit, the microprocessor CPU identifies the peripheral it belongs to and copies the entire contents of the relative interrupt pending register PERIPHERAL INT PENDING REG in the auxiliary register TEMP INT PENDING REG.

The encoding circuit ENCODER generates a bit string that identifies the position of a first active bit stored in the auxiliary register and sends it to the microprocessor through the register FIRST ONE REG and the bus DATA BUS. In the illustrated example, the connected peripherals have 32-bit registers for storing pending interrupts, thus a 5-bit string is sufficient for encoding the position of the first active bit.

Optionally, the encoding circuit ENCODER may also generate a second bit string for encoding the last active bit stored in the auxiliary register, and even a third bit string for encoding the number of active bits stored therein. These last two strings are stored in respective dedicated registers LAST ONE REG and NUMBER OF ONES REG, before being sent to the microprocessor.

Figure 5:
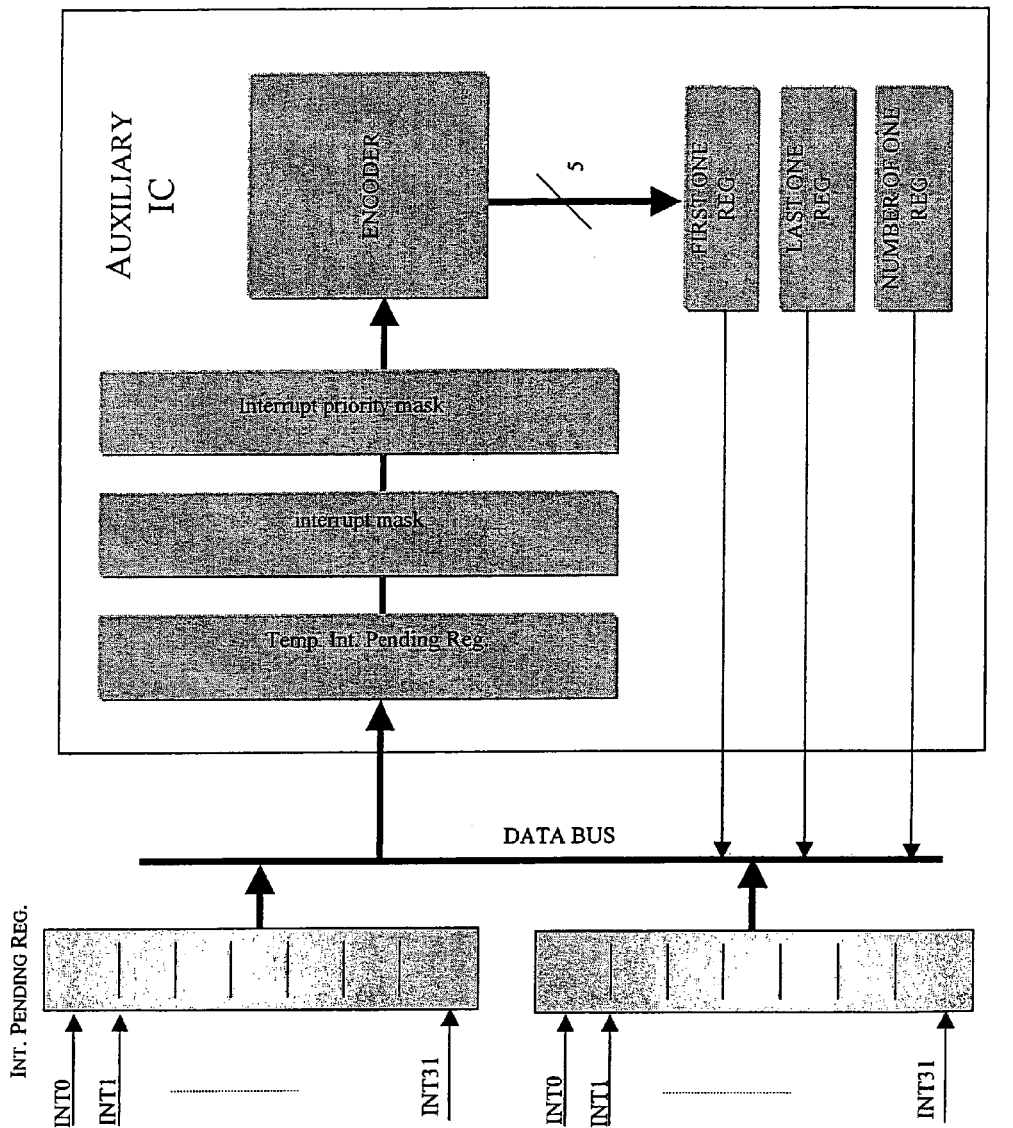
FIG. 5 is a schematic circuit diagram illustrating a second embodiment of an auxiliary interrupt control circuit in accordance with the present invention including interrupt mask circuits.

As illustrated in FIG. 5, the auxiliary circuit of the present invention may have priority interrupt masks INT MASK and INT PRIORITY MASK, respectively. Here, the first active bit identified by the string generated by the encoding circuit ENCODER corresponds to the interrupt with highest priority. For example, assuming that the auxiliary register stores the following string:

0001 0010 0011 1100 1000 1000 0000 0000, and the priority interrupt mask(s) assigns a higher priority to the bits from the ninth to the twentieth than to the other bits, the encoding circuit ENCODER will identify the eleventh bit with the first string, because it is the first active bit having the highest priority.

In the case where the auxiliary register stores the following string:

0001 0010 0000 0000 0000 1000 0000 0000, and the priority interrupt mask(s) is the same as in the previous example, the first string of the circuit ENCODER will identify the fourth bit.

Figure 6:
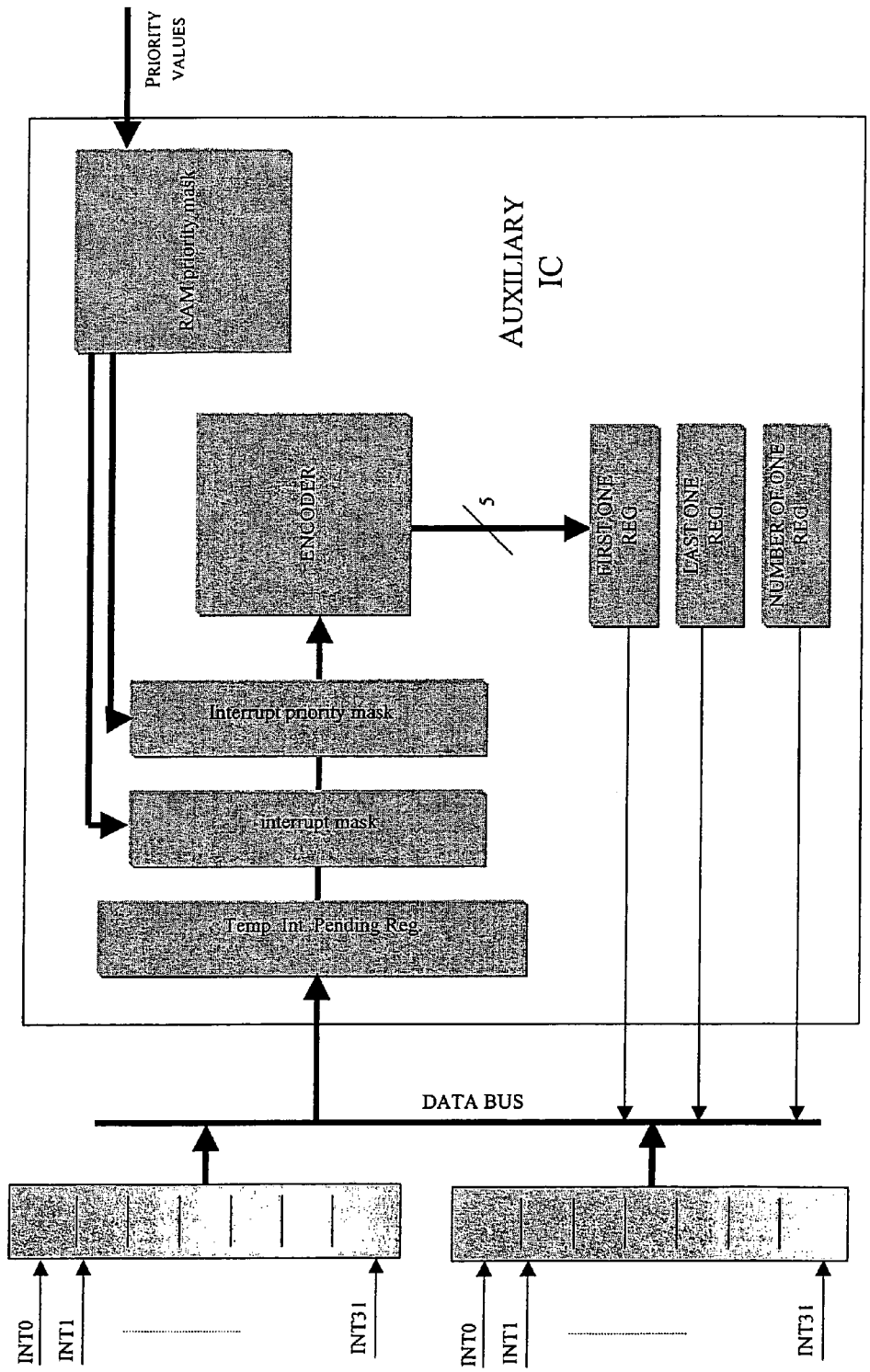
FIG. 6 is a schematic circuit diagram illustrating another embodiment of an auxiliary interrupt control circuit in accordance with the present invention including a RAM for defining the priority levels of interrupts.

According to another embodiment illustrated in FIG. 6, the auxiliary interrupt control circuit of the present invention illustratively includes a writable memory RAM PRIORITY MASK that stores priority values for configuring, from time to time, the priority interrupt mask(s). It is generally desirable to embody the auxiliary circuit of the present invention in the interrupt control circuit. This allows the same memory that is already present in a common interrupt control circuit INTERRUPT CONTROLLER to be shared for the same functions. This is particularly convenient given that the memory of the interrupt control circuit that stores priority values is periodically updated. Having a memory RAM PRIORITY MASK in the auxiliary control circuit as well would require a duplication of the updating.

Figure 7:
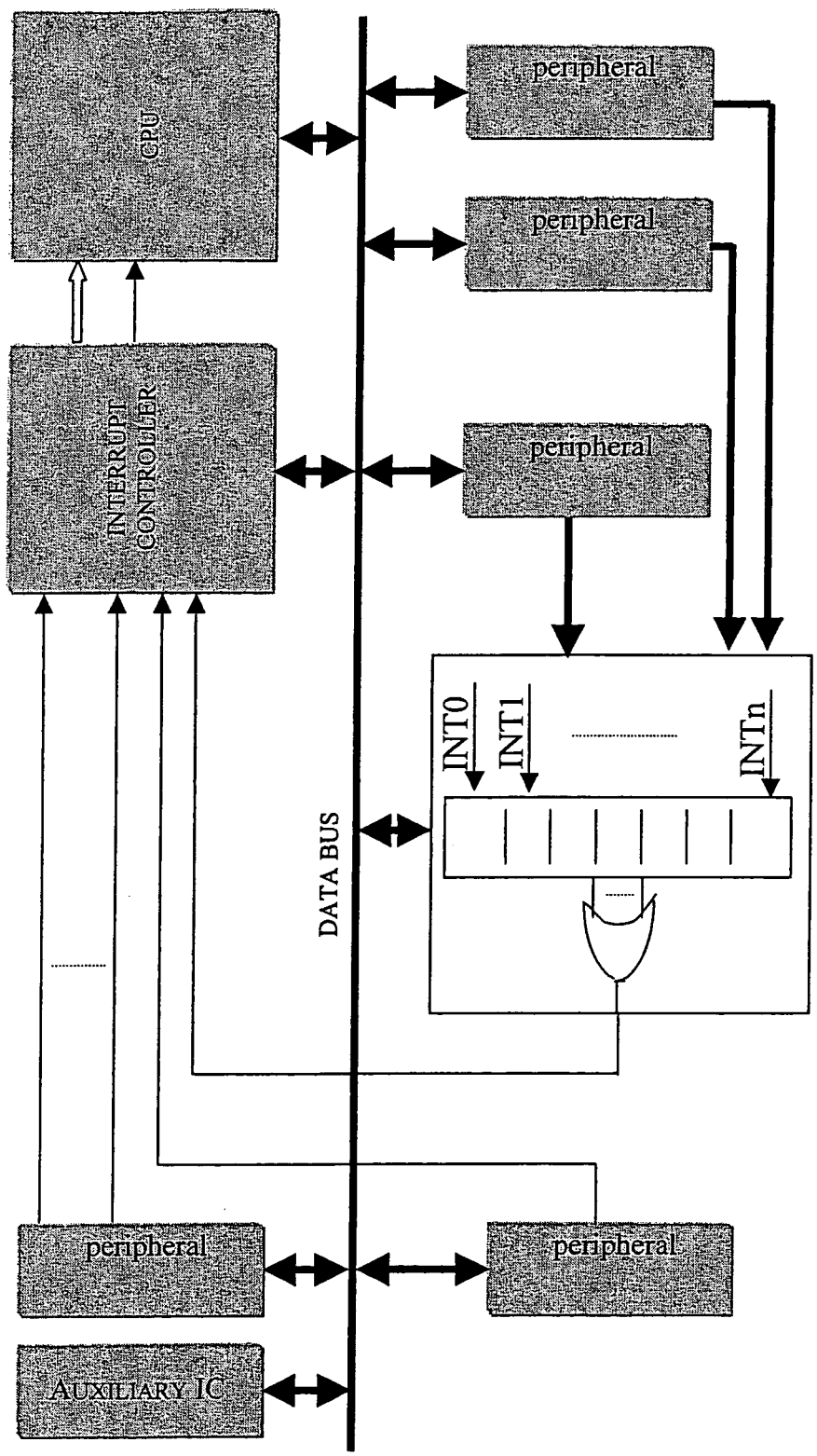
FIG. 7 is a schematic circuit diagram illustrating a microprocessor system including an auxiliary interrupt control circuit in accordance with the present invention.
Figure 8:
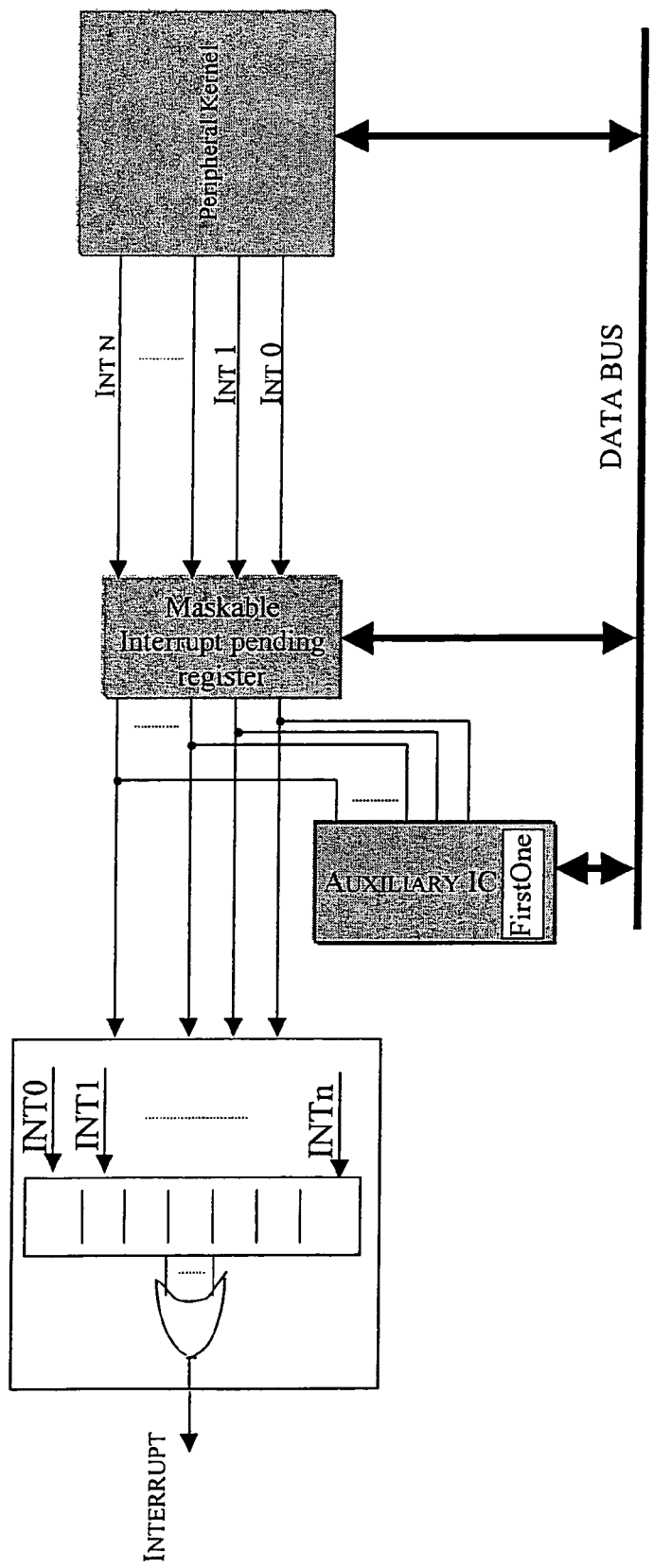
FIG. 8 is a schematic circuit diagram of a peripheral including an auxiliary interrupt control circuit in accordance with the present invention.

The auxiliary interrupt control circuit AUXILIARY IC in accordance with the present invention may be implemented as a separate device that is coupled to a plurality of peripherals, as illustrated in FIG. 7. It may also be incorporated in a respective peripheral for providing to the interrupt control circuit an interrupt signal corresponding to the logic OR of different interrupt flags. This embodiment is illustrated in FIG. 8. Here, the peripheral illustratively includes the interrupt pending register INT PENDING REG and the peripheral circuits PERIPHERAL KERNEL. The block PERIPHERAL KERNEL generates the interrupts flags INT0, . . . , INTn that are stored in the interrupt pending register INT PENDING REG, while an OR gate generates the interrupt signal IRQm that is provided to the control circuit INTERRUPT CONTROLLER by ORing the various interrupt flags.

The auxiliary control circuit reads the interrupt pending register and generates, at a minimum, a code that identifies a first active bit in the register INT PENDING REG and sends it to the processor through the bus DATA BUS. Optionally, the auxiliary circuit embodied in the peripheral may also include a priority mask(s) as discussed above with reference to FIG. 5.

That which is claimed is:

1. A computer system comprising:
   at least one peripheral for generating interrupt requests;
   an interrupt pending register for storing the interrupt requests;
   a microprocessor for processing interrupts;
   an interrupt control circuit coupled to said interrupt pending register and said microprocessor for providing an interrupt command to said microprocessor based upon the stored interrupt requests; and
   an auxiliary interrupt control circuit coupled to said at least one peripheral and said microprocessor for generating a bit string identifying an active bit stored in the interrupt pending register of the peripheral that generated the interrupt request and which corresponds to a highest priority interrupt request to be processed, and for providing the bit string to said microprocessor;
   said microprocessor identifying and processing an interrupt corresponding to the highest priority interrupt request based upon the bit string and the interrupt command without having to read said interrupt pending register and without having to perform another operation to identify the peripheral that generated the interrupt request.

2. The computer system of claim 1 wherein said auxiliary interrupt control circuit comprises an encoder for generating the bit string based upon a position of the active bit in the interrupt pending register.

3. The computer system of claim 2 further comprising an auxiliary register coupled to said interrupt pending register for storing a copy of the interrupt requests, and wherein said encoder generates the bit string based upon the interrupt requests stored in said auxiliary register.

4. The computer system of claim 2 wherein said auxiliary interrupt control circuit further comprises at least one interrupt priority mask circuit coupled to said encoder, and wherein said encoder generates the bit string responsive to said at least one interrupt priority mask circuit.

5. The computer system of claim 4 wherein said auxiliary interrupt control circuit further comprises a memory coupled to said at least one priority mask circuit for storing interrupt priority values for configuring said at least one priority mask circuit.

6. The computer system of claim 1 wherein the bit string comprises a first bit string; and wherein said auxiliary interrupt control circuit further generates and provides to said microprocessor a second bit string identifying a position of a last active bit in said interrupt pending register.

7. The computer system of claim 6 wherein said auxiliary interrupt control circuit further generates and provides to said microprocessor a third bit string identifying a total number of active bits in said interrupt pending register.

8. The computer system of claim 1 wherein the identified active bit of the highest priority interrupt request is the first active bit in the pending interrupt register.

9. An auxiliary interrupt control circuit for use in a computer system comprising at least one peripheral for generating interrupt requests, an interrupt pending register for storing the interrupt requests, a microprocessor for processing interrupts, and an interrupt control circuit associated with said microprocessor, said auxiliary control circuit comprising:

an auxiliary register coupled to said priority interrupt register for storing a copy of the interrupt requests; and
an encoder coupled to said auxiliary register and the microprocessor for generating a bit string identifying an active bit stored in the auxiliary register of the peripheral that generated the interrupt request and which corresponds to a highest priority interrupt request to be processed, and for providing the bit string to the microprocessor so that the microprocessor identifies and processes an interrupt corresponding to the highest priority interrupt request based upon the bit string and an interrupt command without having to read said interrupt pending register and without having to perform another operation to identify the peripheral that generated the interrupt request.

10. The auxiliary interrupt control circuit of claim 9 wherein said encoder generates the bit string based upon a position of the active bit in the interrupt pending register.

11. The auxiliary interrupt control circuit of claim 9 further comprising at least one interrupt priority mask circuit coupled to said encoder, and wherein said encoder generates the bit string responsive to said at least one interrupt priority mask circuit.

12. The auxiliary interrupt control circuit of claim 11 further comprising a memory coupled to said at least one priority mask circuit for storing interrupt priority values for configuring said at least one priority mask circuit.

13. The auxiliary interrupt control circuit of claim 9 wherein the bit string comprises a first bit string; and wherein said encoder further generates and provides to the microprocessor a second bit string identifying a position of a last active bit in said auxiliary register.

14. The auxiliary interrupt control circuit of claim 13 wherein said encoder further generates and provides to the microprocessor a third bit string identifying a total number of active bits in said auxiliary register.

15. A peripheral to be coupled to a microprocessor having an associated interrupt control circuit, the peripheral comprising:
   a peripheral controller for generating interrupt requests;
   an interrupt pending register for storing the interrupt requests; and
   an auxiliary interrupt control circuit coupled to said interrupt pending register and the microprocessor for generating a bit string identifying an active bit stored in said interrupt pending register of the peripheral that generated the interrupt request and which corresponds to a highest priority interrupt request to be processed, and for providing the bit string to the microprocessor so that the microprocessor identifies and processes an interrupt corresponding to the highest priority interrupt request based upon the bit string and an interrupt command without having to read said interrupt pending register and without having to perform another operation to identify the peripheral that generated the interrupt request.

16. The peripheral of claim 15 wherein said auxiliary interrupt control circuit comprises an encoder for generating the bit string based upon a position of the active bit in the interrupt pending register.

17. The peripheral of claim 16 wherein said auxiliary interrupt control circuit further comprises at least one interrupt priority mask circuit coupled to said encoder, and wherein said encoder generates the bit string responsive to said at least one interrupt priority mask circuit.

18. The peripheral of claim 15 wherein the bit string comprises a first bit string; and wherein said auxiliary interrupt control circuit further generates and provides to said microprocessor a second bit string identifying a position of a last active bit in said interrupt pending register.

19. The peripheral of claim 18 wherein said auxiliary interrupt control circuit further generates and provides to said microprocessor a third bit string identifying a total number of active bits in said interrupt pending register.

20. A method for processing peripheral interrupts comprising:
generating interrupt requests using at least one peripheral and storing the interrupt requests in a pending interrupt register;
generating a bit string identifying an active bit of the peripheral that generated the interrupt request and which corresponds to a highest priority interrupt request stored in the pending interrupt register to be processed; and
identifying and processing an interrupt corresponding to the highest priority interrupt request based upon the bit string, the identifying and processing being performed by a microprocessor coupled to the pending interrupt register and without the microprocessor having to read the interrupt pending register and without having to perform another operation to identify the peripheral that generated the interrupt request.

21. The method of claim 20 wherein the identified active bit of the highest priority interrupt request is the first active bit in the pending interrupt register.

22. The method of claim 20 wherein the bit string comprises a first bit string, and further comprising generating a second bit string identifying a last active bit in the interrupt pending register prior to identifying and processing.

23. The method of claim 22 further comprising generating a third bit string identifying a total number of active bits in the interrupt pending register prior to identifying and processing.

24. The method of claim 20 wherein generating the bit string comprises copying the interrupt requests from the interrupt pending register to an auxiliary register and generating the bit string based upon the copied interrupt requests.

* * * * *